United States Patent [19]

Ligon, Jr. et al.

[11] 4,273,674

[45] Jun. 16, 1981

[54] THERMAL DETECTING PAINT COMPOSITIONS

[75] Inventors: Woodfin V. Ligon, Jr., Schenectady; Jimmy L. Webb, Ballston Lake, both of N.Y.

[73] Assignee: General Electric Company, Schenectady, N.Y.

[21] Appl. No.: 97,350

[22] Filed: Nov. 26, 1979

Related U.S. Application Data

[63] Continuation-in-part of Ser. No. 869,140, Jan. 13, 1978, abandoned, which is a continuation-in-part of Ser. No. 806,600, Jun. 15, 1977, abandoned.

[51] Int. Cl.$^3$ .................. C09D 5/26; C09D 3/58; C09D 3/64; C09K 3/00; G01K 11/00; G01K 13/00

[52] U.S. Cl. .................. 252/408; 564/183; 422/63; 23/232 R; 23/232 C; 23/232 E; 73/23; 73/23.1; 73/28; 73/340; 73/344; 73/349; 252/316; 310/52; 310/55; 310/56; 260/326 HL; 422/62.63; 422/89; 422/90; 422/98; 562/442

[58] Field of Search ............. 252/408, 316, 8.1; 73/339 R, 339 TP, 23, 23.1, 28, 340, 344, 349; 23/232 R, 232 C, 232 E, 254 R, 254 E, 255 R, 255 E; 422/62, 63, 89, 90, 98; 260/558 D, 326 HL; 562/442

[56] References Cited

U.S. PATENT DOCUMENTS

| 2,443,888 | 6/1948 | Bohrer | 260/326 HL |
|---|---|---|---|
| 2,724,643 | 11/1955 | Morris et al. | 260/558 D |
| 3,014,033 | 12/1961 | Bertus et al. | 562/442 |
| 3,427,880 | 2/1969 | Grobel et al. | 73/339 R |
| 3,474,136 | 10/1969 | Dunkel et al. | 562/442 |
| 3,507,904 | 4/1970 | Schwartz et al. | 260/326 HL |
| 3,868,388 | 2/1975 | Dotson, Jr. et al. | 252/8.1 |
| 3,873,567 | 3/1975 | Cyba | 252/8.1 |
| 3,916,671 | 11/1975 | Carson et al. | 73/23.1 |
| 3,955,417 | 5/1976 | Smith et al. | 73/339 R |
| 3,957,014 | 5/1976 | Phillips et al. | 73/339 R |
| 3,964,294 | 6/1976 | Shair et al. | 252/408 |
| 3,972,225 | 8/1976 | Fort et al. | 73/28 |
| 3,973,438 | 8/1976 | Smith et al. | 73/339 R |
| 4,001,179 | 1/1977 | Richter et al. | 252/8.1 |
| 4,022,830 | 5/1977 | Watts, Jr. | 260/558 D |
| 4,092,345 | 5/1978 | Wolford et al. | 252/8.1 |
| 4,142,416 | 3/1979 | Smith et al. | 252/408 |
| 4,168,625 | 9/1979 | Smith et al. | 252/408 |
| 4,179,926 | 12/1979 | Phillips et al. | 252/408 |
| 4,204,428 | 5/1980 | Webb et al. | 252/408 |

FOREIGN PATENT DOCUMENTS

| 47-27138 | 7/1972 | Japan | 260/326 HL |
|---|---|---|---|
| 653027 | 5/1951 | United Kingdom | 260/558 D |

OTHER PUBLICATIONS

Pietsch, H. et al., "Sacrificial Coatings for Improved Detection of Overheating in Generators," IEEE-PES Winter Meeting, N.Y., N.Y., (2/4/77).

Fort, E. et al., "Detection & Identification of Overheated Components of Electrical Generators," IEEE-ASME Joint Power Generation Conf., Miami, Fla., (9/19/74).

*Primary Examiner*—Teddy S. Gron
*Attorney, Agent, or Firm*—William A. Teoli; James C. Davis, Jr.

[57] ABSTRACT

Sets of certain halogenated aromatic organic compounds, for example, N-alkyl tetrahalophthalimides, have been found useful as chemical tags when employed in a thermal particulating organic resin. Improved tagging performance has been achieved over extended use periods at temperatures up to 140° C., if the tags are microencapsulated prior to incorporation into the particulating organic resin.

28 Claims, No Drawings

THERMAL DETECTING PAINT COMPOSITIONS

This application is a continuation-in-part application of pending application Ser. No. 869,140, filed Jan. 13, 1978, now abandoned, which is a continuation-in-part application of application Ser. No. 806,600, filed June 15, 1977, now abandoned, both applications being assigned to the same assignee as the present invention.

The present invention relates to a thermal detection system useful for locating failure in electrical apparatus, such as apparatus useful in generating electric power. More particularly, the present invention relates to the use of certain chemical tagging compounds, such as poly-haloaromatic N-organo substituted phthalimides, which can be employed in extremely low concentrations as finger prints, in organic resin insulating coatings.

U.S. Pat. No. 3,427,880, Grobel et al, assigned to the same assignee as the present invention, for Over Heating Detector For Gas Cooled Electric Machine, shows the use of an ion chamber particle detector for detecting excessive heating of gas cooled components in an electric generator. Local overheating of parts in the stator core of a gas cooled dynamo electric machine, such as the stator laminations, can be detected by the use of an ion chamber particle detector and an indicator for showing the presence of smoke. Certain coating materials, such as polystyrene, polymethylmethacrylate, etc., were suggested as giving advanced warning when temperatures in the range of 230° C. to 240° C. were obtained. It was further suggested that the use of a temperature indicating paint changing color from yellow to brown at 235° C. would allow the operator to locate where the particulate was being generated. A further publication "Immediate Warning of Local Over Heating in Electric Maching by the Detection of Pyrolysis Products", which was presented at the Institute of Electrical and Electronic Engineers, Powder Engineering Society, summer meeting in July 19, 1972, by C. Carson et al, suggested that mass spectrometric analysis and gas chromatographic analysis could be used to indicate the area where local overheating was occuring in electric apparatus by the use of selective coatings. Various pyrolysis products, such as phenolic varnish, epoxy-glass pressed composites, silicon rubber, etc., were shown to provide various peaks, based on the use of the mass spectrometer and gas chromatograph. Additional study was required to clearly differentiate and identify particulate arising from gas streams, such as hydrogen or helium used to cool electric apparatus. It was virtually impossible to specifically locate the area from which the particulate was generated in the electric apparatus because of the complexity of the mixture which normally contained a number of background materials continuously evolved under normal operating conditions.

Additional investigation of the problem of making compositions useful for forming thermal particulating coatings in electrical apparatus for the purpose of locating local overheating, as shown by Forte et al, U.S. Pat. No. 3,982,225 and Smith et al U.S. Pat. Nos. 3,973,438 and 439. Particular chemical compounds, such as malonic acid and metal acetyl acetonates, were proposed by Smith et al as compounds to form a thermal particulating coating at a particular temperature, such as 125° C. or 90°-180° C. Concentrations of from 5 parts to 200 parts of the aforementioned compounds, per 100 parts of the resin carrier were suggested. In addition, an organic solvent oculd also be utilized in the composition. For obvious reasons, it was highly unlikely that such coating materials were feasible under actual operation conditions in electric apparatus, such as a turbine generator, which must be maintained in a critical controlled environment, substantially free of contaminants. In Chemical Monitoring of Hydrogen Cooled Turbine Generators Brought Up To Date", by Sexton et al, Rotating Machinery, 42AIC75, Sec. 7-401-7-406, it has been suggested that carefully formulated sacrificial compounds capable of particulating at a temperature of between 100° C. to 130° C. could be employed to give an indication of the specific location within the machine where the overheating is taking place or particulate at a temperature of 70°-100° C. less than the normal organic materials. Efforts to achieve such results, based on the aforementioned guidelines, were unsuccessful because in many instances it was difficult to specifically identify the chemical tagging compound unless high concentrations were employed to overcome background interference in the particulate which created contamination problems. In addition, if the compound vaporized at too low a temperature, it invariably would be released from the thermal particulating resin coating during extended operation at normal temperatures, based on its volatility. Further, it was difficult to differentiate the sacrificial compounds from other sacrificial compounds where different sacrificial compounds or "tags" were applied over a variety of locations in the electric apparatus.

The present invention is based on the discovery that certain polyhalogenated aromatic compounds or polyfluorinated aliphatic compounds having a chemical decomposition temperature of at least 100° C. higher than the particulating temperature of the organic resin matrix material, can be detected at extremely low levels of concentration when utilizing a gas chromatograph equipped with an electron capture detector or a micro coulometric detector.

There is provided by the present invention, a thermal detection system for electrical apparatus, comprising a monitor suitable for detecting smoke particles, a collecting means for removing said smoke particles for analysis and a thermal particulating organic resin coated on several surfaces of the electrical apparatus, where a set of at least two different chemical tags are respectively utilized on different surfaces of the electrical apparatus at a concentration in the thermal particulating organic resin coating of from about 0.01% to 0.5% and are characterized by having a volatility range equivalent to a $C_{(24-45)}$ aliphatic paraffin and are selected from aromatic polychlorinated organic compounds, aromatic polyfluorinated organic compounds and aliphatic polyfluorinated organic compounds capable of resisting chemical decomposition up to temperatures of at least 100° C. greater than the smoking temperature of the thermal particulating organic resin, and where each chemical tag can be readily distinguished from another chemical tag when utilized in the thermal particulating organic resin and collected with the organic resin particulate obtained from the collecting means and analyzed as a solvent extract in a gas chromatograph equipped with an electron capture detector or a micro coulometric detector and identified as a member of the total set of chemical tags utilized in the electrical apparatus to establish the location of the organic resin particulate generated in the electrical apparatus.

The chemical tags which can be used in combination with the thermal particulating organic resin in the practice of the invention, are compounds including aromatic polychlorinated organic compounds, aromatic polyfluorinated organic compounds and aliphatic polyfluorinated organic compounds having a volatility in the range of a $C_{(24-45)}$ aliphatic paraffin. Among the preferred chemical tagging compounds which can be used in the practice of the present invention are tetrahalophthalamic acids of the formula,

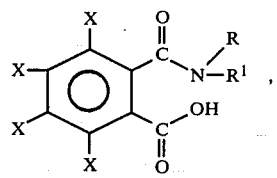 (1)

tetrahalobenzamides of the formula

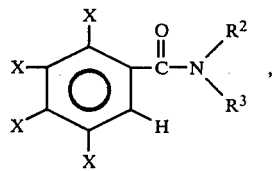 (2)

and tetrahalophthalimides of the formula,

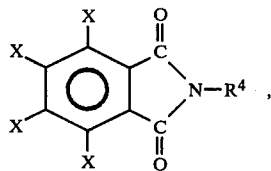 (3)

where X is a halogen radical, R and $R^1$ are separately selected from $C_{(1-24)}$ alkyl radicals, which together total $C_{(12-24)}$ carbon atoms, $C_{(6-20)}$ cycloalkyl radicals and heterocyclic radicals, where the divalent heterocyclic radical joined to N of formula (1) has the formula,

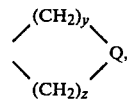

Q is selected from —O—, —S— and —SO$_2$— and y and z are integers having a value of 1 to 24 inclusive while together total 12 to 24; $R^2$ and $R^3$ are selected from alkyl and cycloalkyl radicals as previously defined for R and $R^1$; $R^4$ is selected from $C_{(6-20)}$ alkyl, cycloalkyl and —$R^5yR^6$—, where $R^5$ and $R^6$ are selected from $C_{(2-13)}$ alkyl and together total $C_{(4-14)}$ alkyl and y is a member selected from the class consisting of —O—, —S— and —SO$_2$—.

Radicals included by X of formulas 1-3 are, for example, chloro, and fluoro; alkyl radicals included by R–$R^6$ are, for example, methyl, ethyl, propyl, butyl, pentyl, etc.; cycloalkyl radicals included jointly by R and $R^1$, or $R^2$ and $R^3$ are, for example, cyclohexyl, cycloheptyl, cyclooctyl, etc. Radicals included by $R^4$ are also methoxypropyl, methyl-thiopropyl, methyl sulfone propyl, etc.

The tetrahalophthalamic acids of formula (1) can be synthesized by standard procedures from tetrachlorophthalic anhydride and a secondary amine such as diisopropyl amine, dibutyl amine, diamyl amine, dihexyl amine, dicyclohexyl amine, pyrrolidine, morpholine, 2,6-dimethyl morpholine, piperidine. There can be used two equivalents of amine per equivalent of tetrachlorophthalic anhydride in tetrahydrofuran solvent at room temperature.

The tetrahalophthalimides of formula (3) can be made in accordance with standard techniques using tetrahalophthalic anhydride and a primary amine such as hexyl amine, 2-amino-3,3-dimethylbutane, cyclohexyl amine, octyl amine, 2-octyl amine, cyclooctyl amine, dodecyl amine, adamantyl amine, 3-methoxylaminopropane, cyclododecyl amine, cycloheptyl amine, nonyl amine, decyl amine, heptyl amine, etc.

Compounds of formulas (1)–(3) can be utilized as chemical tags in combination with various particulating organic resin compositions, which are capable of smoking at temperatures below 250° C. and which include insulating resin useful for insulating metallic conductors which may or may not be pigmented, or as a paint which can be applied on existing insulating organic resin compositions used for insulating various parts of electric apparatus, such as a wire insulation, stator laminations, etc.

It has been found that a critical relationship exists between the number of carbon atoms present in R—$R^4$ of formulas 1–3 as defined above, and the ability of these compounds to serve as chemical tags in the thermal detection system of the present invention. For example, if $R^4$ is less than six carbon atoms, or the sum of R and $R^1$ or $R^2$ and $R^3$ respectively is less than twelve carbon atoms, the compounds of formulas 1–3 cannot be identified in the particulate generated as a result of thermal breakdown of the electrical generating apparatus.

An important aspect of our invention is the use of a gas chromatograph equipped with a $^{63}$Ni Electron Capture Detector ($^{63}$Ni ECD) such as those commercially available from Hewlett Packard and Varian Aerograph. The basic principles of operation of the $^{63}$Ni ECD involves a radioactive foil ($^{63}$Ni) which emits particles with a maximum energy of about 67 KeV. As the particles travel through the carrier gas, they ionize the carrier gas (nitrogen or methane-argon) and produce positive ions and secondary electrons. The negative cell voltage applied to the cathode connection causes the secondary electrons (free electrons) to be driven toward the anode connection. The free electrons are collected at the anode and produce a steady background (standing) current. When a sample compound with an affinity for free electrons enters the detector, the standing current is reduced. The amount of reduction is a function of the sample concentration and the electron affinity of the compound. The decrease in standing current is sensed by an electrometer through the anode connection. This signal is them amplified to a sufficient level to operate a potentiometer strip chart.

In general terms, the tag design aspect of our invention consists of any set of two or more halogenated compounds which can be resolved by a gas chromatograph equipped with an electron capture detector, where halogenated means multiply chlorinated or fluorinated and where the boiling point of all members of the set is such that the Kovats Index on OV-17 (phenylmethylpolysiloxane) is between a $C_{27}$ and a $C_{45}$ hydrocarbon. The Kovats Index, described in detail in a paper by Wehrli and Kovats, Helv. Chim. Acta., 42, 2709, (1959), is a retention index and appears to relate to the ability of the tag to be incorporated into the smoke particles. The primary factors are polarity and molecular weight which are also related to the boiling point. It should be noted that other liquid phases, such as OV-1 (dimethylpolysiloxane), can be used and these may provide different resolutions.

Suitable particulating organic resins which can be used in combination with the above chemical tags of formulas 1-3 in the practice of the invention, are pigmented epoxy paints of the Insulating and Laminating Business Department of the General Electric Company, such as (74004) diglycidyl ether of Bisphenol-A used with (74010) amine terminated polyamide hardener. This epoxy paint can be pigmented with various colors. In addition, a water based modified alkyl, Reeves 2967, of the C. A. Reeves Paint Company of Syracuse, New York also can be used. Other organic paints also can be used which can be thermally particulated at temperatures below 250° C., etc.

Where operating temperatures can be as high as 140° C., the chemical tags of the present invention are preferably microencapsulated before being incorporated into the particulating organic resin. A typical encapsulation procedure involves initial heating of the tags in an inert atmosphere at a temperature of at least 150° C. (or melting the tag) until all volatiles are substantially removed. Microencapsulation is effected by coacervation by (1) establishment of a three-phase system, with liquid vehicle as the continuous phase; (2) deposition of liquid polymeric material around the material to be coated; (3) gelation of the polymeric coating material in accordance with Green et al U.S. Pat. No. 2,800,457 and Hart et al U.S. Pat. No. 3,755,190.

In the practice of one form of the invention, electric apparatus subject to overheating in particular locations, such as a stator core or a turbine generator, can be painted with a pigmented thermal particulating resin in at least two different locations with a different chemical tag in each location. As used hereinafter, the term "thermal particulating organic resin" will signify a tag containing pigmented coating in an electric apparatus which has been applied onto existing insulation of such electric apparatus.

As described in the above cited publication of Carson et al, "Immediate Warning of Local Overheating in electrical Machines by the Detection of Pyrolysis Products", a typical electric generator powered by a steam turbine can develop local overheating in stator cores, based on damage to the surface of a "tooth". In instances where a thermal condition is created which is capable of causing the smoking of a thermal particulating organic resin, the smoke can be carried to a core monitor using an ionization chamber detector, based on the circulation of hydrogen coolant. A collector is employed to trap the smoke particles for analysis. Removal of the collector and the treatment of the trapped particulate with an organic solvent can provide an extract useful for gas chromatographic analysis. An electron capture detector utilized with the gas chromatograph can readily identify specific chemical tags even at extremely low concentrations, although the particulate consists of a wide variety of pyrolyzed volatiles carried by the hydrogen coolant from throughout the whole generator. The application of the electron capture detector in Gas-Liquid Chromatography is shown by Martin Scolnick, "The Concentric Cylinder Electron Capture Detector Standing Current Studies in the DC and Pulsed Voltage Modes", Journal of Chromatographic Science, 7, 263 (1969). Also "An Introduction to Separation Science", Barry L. Karger et al, pp. 232-4, John Wiley & Sons, New York (1973).

In another aspect of the invention, the electric apparatus can be a combination of wire terminals in a telephone exchange, a power system in a nuclear submarine, a nuclear power plant, etc. In instances where circulating gaseous coolant is not used, a smoke detector can be employed to activate a vacuum system to collect particulate which can be then analyzed as previously described. The location of the source of failure can be readily determined by employing the electron capture technique as described above.

In order that those skilled in the art will be better able to practice the invention, the following examples are given by way of illustration and not by way of limitation. All parts are by weight.

EXAMPLE 1

Several mixtures having respectively equal molar amounts of tetrachlorophthalic anhydride and a different primary amine were refluxed in acetic acid under nitrogen over periods of from 2-168 hours. Each mixture was allowed to cool to room temperatures and each of the respective products was allowed to crystallize. The crystalline materials were respectively collected on a filter, washed with water and dried in vacuo resulting in a yield of between 67-98% of the corresponding N-alkyl or N-cycloalkyl tetrachlorphthalimide. The following amines were employed in making the N-alkyl tetrachlorophthalimides by the aforementioned procedures:

| Amine | Imide (Melting Point °C.) |
| --- | --- |
| Ethyl Amine | 191.5-195 |
| Isobutyl Amine | 178-179.5 |
| Pentyl Amine | 147.6-149 |
| Hexyl Amine | 150-151.5 |
| 2-Amino-3,3-dimethyl Butane | 165-165.5 |
| Octyl Amine | 142-143 |
| Cyclo Octyl Amine | 240-207 |
| Dodecyl Amine | 135.5-137 |
| Adamantyl Amine | 235-238.5 |
| Aniline | 273-274 |

A second set of compounds or "tags" were synthesized by the following procedure: Two equivalents of a secondary amine were combined with one equivalent of tetrachlorophthalic anhydride in tetrahydrofuran at room temperatures and the mixture was stirred and allowed to stand for 1 hours. The resulting solution was evaporated to dryness and the residue dissolved in water and acidified with HCl. The crystals which separated on acidification were filtered and recrystalized. As the secondary amine, there was employed dihexyl amine and morpholine which respectively formed the corresponding tetrachlorophthalamic acid having a melting point of 113°-114° C. and 111.5°-113° C.

Several paints were respectively prepared by mixing about 100 parts of diglycidyl ether of Bisphenol-A having 73% solids containing about 0.1% by weight of one of the above-identified chemical tags, with 29.43 parts of an amine terminated polyamide amine hardener. The respective paints were then applied to a thickness of 0.01 inch onto several 1"×13" nichrome strips which were allowed to cure. The painted nichrome strips were then mounted on a flange with a common center electrode and 9 independent electrodes situated radially about the center. The flange was then mounted onto the main housing in the interior of a large steam turbine-generator. A large electric arc welder power supply (400 amps) was connected to the common central electrode and sequentially to each of the radial electrodes. Current was randomly applied to each of the nichrome strips at intervals of about 20 minutes and maintained for a 5 minute period for each strip to effect the pyrolysis of the resin on the strip. A pyrolysis signal was observed on the core monitor connected to a test operating generator. A portion of hydrogen coolant was then vented through a glass fiber disc. The disc collected the pyrolyzed particulate and the collection continued as long as the signal was being received on the core monitor. During the sampling period, the power was gradually increased through the test strip to insure complete pyrolysis of the sample. After a pyrolysis signal was no longer detected on the core monitor, sampling through the glass filter terminated. At this point, the lead from the power supply, connected to a particular radial electrode, was advanced to another radial electrode in accordance with an arbitrary, but recorded sequence. All of the 9 nichrome strips were sequentially electrically heated to effect the generation of particulate which was collected on respective glass fiber discs. As the glass fiber discs were removed from the collector, they were placed in glass vials, containing methanol, numbered in the same order the glass fiber discs were removed from the collector. The glass vials were then shaken and the methanol extract was analyzed as described below to determine the presence of a particular N-alkyl tetrachlorophthalimide or benzamide. Identity of a particular tag was confirmed by comparing its elution volume on a gas chromatograph trace of the total set of the N-alkyl phthalimides used in the test.

There was used a Hewlett Packard 5830A Gas Chromatograph equipped with an electron capture detector. The analytical conditions are summarized below:

| Column: | 6' × 0.25" Pyrex packed with 3% OV-17 on gas chromatograph 100–120 mesh |
| --- | --- |
| Injector: | 300° C. |
| Detector: | 300° C. |
| Oven: | Programmed from 240–270° C. at 4° min. |
| Flow: | 38 ml/min Argon-Methane |
| Sample Injection: | One microliter injected using a Hamilton 10 microliter syringe |

The following results were obtained when the respective particulate extracts were analyzed by the gas chromatograph using the electron capture detector in accordance with above procedure, where "tag" is expressed in terms of the organic radical attached to the amine used in making either the tetrachlorophthalamic acid or the N-alkyl tetrachlorophthalimide and the term "detected" indicates whether the analysis of the particulate extract using the gas chromatograph and the electron capture detector to determine the presence of the tag in the particulate was effective or not:

| Tag | Detected |
| --- | --- |
| Hexyl | Yes |
| Cyclo Octyl | Yes |
| Dodecyl | Yes |

-continued

| Tag | Detected |
| --- | --- |
| 3,3-dimethyl 2-butyl | No |
| Pentyl | No |
| Morpholine | Yes |
| Isobutyl | No |
| Ethyl | No |
| Methoxy Propyl | Yes |

The above results show that the volatility of the tag in terms of the length of the alkyl chain attached to nitrogen is a significant factor with respect to whether the particular N-alkyl tetrachlorophthalimide or tetrachlorophthalamic acid can be employed as a tag in the practice of the present invention.

In a subsequent run following the same procedure, additional tags were identified, such as adamantyl, and octyl tetrachlorophthalimides and dihexyl tetrachlorobenzamide. The latter resulted from thermal decarboxylation of the corresponding amic acid included by formula (1).

EXAMPLE 2

Various parts of a 496 MVA-2 pole large steam turbine generator are painted with a set of chemical tags in accordance with the procedure of Example 1. More specifically, the epoxy paint of Example 1 is pigmented with various colors, and the pigmented tag containing paints are applied to different parts of the turbine-generator as shown as follows:

| Color | Chemical Tag (Tetrachlorophthalimide) | Turbine Generator part |
| --- | --- | --- |
| Pink | N-methoxy-propyl | Turbine end core |
| Blue | N-hexyl | Center core |
| Orange | Dihexyl | Collector & core |
| Yellow | N-heptyl | End winding |
| Green | N-octyl | Lower frame extension |
| Red | Cycloheptyl | Reactor |
| Dark Blue | Cyclooctyl | Transformer |
| Light Blue | Dodecyl | Rotor |

Under normal operation, the above generator is enclosed in a hydrogen atmosphere at a pressure of about 48 psi. During operation a thermal breakdown occurs and the core monitor alarm sounds. A sample of the particulate generated as a result of the breakdown is automatically collected on a glass fiber disc. The generator is then shut down. The glass fiber disc is removed and placed in a vial containing methanol.

The methanol extract is injected into a Hewlett-Packard 5830A Gas Chromatograph equipped with an electron capture detector in accordance with the procedure of Example 1. When the elution volume of the sample is compared to the total trace of the tag set used in the generator as shown above, it is found that N-hexyl tetrachlorophthalimide is present in the particulate. This establishes that the breakdown occurs in the center core of the large steam turbine-generator. An investigation confirms the breakdown and appropriate maintenance is initiated.

EXAMPLE 3

In accordance with the procedure of Example 1, three nichrome wire samples were painted with the epoxy paint of Example 1 which contained about 0.1% of each of the following tags which are expressed in terms of the N-organo radical of either the tetrachlorophthalamic acid or an N-alkyl tetrachlorophthalimide as shown in Example 1, such as methoxy propyl, N-hexyl, dihexyl, N-heptyl, N-octyl, cyclo-heptyl, cyclo-octyl, dodecyl, adamantyl, and cyclo-dodecyl. The paint containing the aforementioned mixture of tags was applied onto plain nichrome wire and also nichrome wire having a polyvinylchloride insulation. The nichrome wire was then heated using about 10V from a 110 volt AC Variac. Smoke was collected in air using a glass filter using a gentle stream of air passing through a glass tube which had the wire positioned at one end and the glass filter at the other end. Following the procedure of Example 1, the extract of the particulate collected on the glass filter was analyzed with a gas chromatograph using an electron capture detector. It was found that all of the tags were readily identified in the three wire samples. This demonstrates that the tags survive pyrolysis in an air atmosphere.

EXAMPLE 4

A threee phase aqueous system is established in accordance with Green et al U.S. Pat. No. 2,800,457 and Hart et al U.S. Pat. No. 3,755,190 utilizing a protein gelatin and gum arabic. Water is established as a continuous phase, a mixture of the protein gelatin and gum arabic as a coating material for one dispersed phase and particulated N-alkyl tetrachlorophthalimide as the other dispersed phase. The mixture is stirred at about 55° C. with the chemical tag being utilized at a seive size range of from about 105-420 microns. The temperature of the mixture is allowed to cool to about 5° C. with continued stirring and glutaraldehyde is added. There is then added resorcinol formaldehyde and urea formaldehyde to build-up an additional layer of formaldehyde polymer. The encapsulated particulate is then dried in a forced air oven to produce a free flowing powder having an increased particle size due to the total layer of up to about 600 microns.

Coated tag particulate is then blended with epoxy paint 47004, diglycidal ether of bisphenol-A used with amine terminated polyamide hardener (74010 of the General Electric Company) to produce a paint having 0.15% by weight of chemical tag.

Nichrome strips are painted with the above paint. A fixed area (150 mm2) of the paint strips are then heat aged over a period of six months at a temperature of 140° C. The sample strips are examined periodically by pyrolysis followed by stripping on a filter disc, leaching with methanol and the leachate analyzed with a gas chromatography equipped with an electron capture detector. The presence or absence of the tag is readily shown by its absorbtion peak while a drop in signal strength indicates a gradual loss. A control is also heat-aged containing chemical tag which is free of encapsulation. The following results are obtained, where the chemical tags have been subjected to a melt and stripping treatment prior to encapsulation to effect the removal of volatiles. "ME" signifies microencapsulation, "failed" indicates complete or significant loss of tag and "unchanged" indicates substantially no loss of tag.

| N-alkyl tetra-Chlorophthalimide | ME | Heat Age (140° C. for 6 mos.) |
|---|---|---|
| N-cycloheptyl | No | failed |
| N-cycloheptyl | Yes | unchanged |
| N-cyclooctyl | No | failed |
| N-cyclooctyl | Yes | unchanged |
| N-dodecyl | No | failed |
| N-dodecyl | Yes | unchanged |

The above results show that microencapsulation of the tag particulate provides improved stability at elevated temperatures over an extended period of time.

Although the above examples are directed to only a few of the very many chemical tags and thermal particulated organic resins which can be used in combination with such tags in the practice of the present invention, it should be understood that the present invention is directed to the use of a much broader variety of chemical tags and such thermal particulating organic resins. For example, the term "aliphatic polyfluorinated organic compound" includes compounds having the following formula,

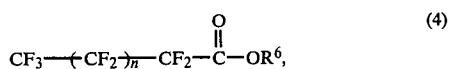

where n is an integer from 1 to 12 inclusive and $R^6$ is selected from $C_{(1-20)}$ alkyl and cycloalkyl radicals, where the volatility of the compounds of formula (4) are as previously defined. In addition to electric generators, the system of the present invention can be applied to control cable bundles in a nuclear power plant, telephone exchange-switching complexes, electric motors, etc. With respect to microencapsulation, a more detailed description can be found in Kirk-Othmer Encyclopedia of Chemical Technology, Second Edition, Vol. 13, pp. 436-456.

What we claim as new and desire to secute by Letters Patent of the United States is:

1. A composition for application to designated portions of a turbine generator and which is useful in determining the location of overheating, said composition comprising
   (a) a coating composition comprising an organic resin having a thermal particulation temperature below 250° C. and
   (b) from 0.1% to 0.5% by weight of a tagging compound selected from the group consisting of:
   (1) an organic compound of the formula

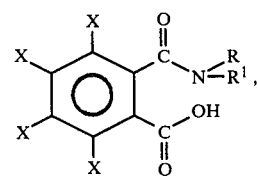

(2) an organic compound of the formula,

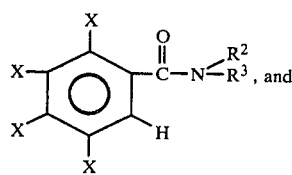

(3) an organic compound of the formula,

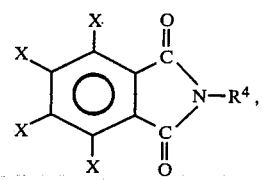

where X is a halogen radical, R and $R^1$ are separately selected from $C_{(1-23)}$ alkyl radicals, which together total $C_{(12-24)}$ carbon atoms, $C_{(6-20)}$ cycloalkyl radicals and heterocyclic radicals, where the divalent heterocyclic radical joined to N has the formula,

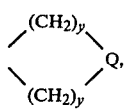

Q is selected from —O—, —S— and —SO$_2$—, y and z are integers having a value of 1 to 23 inclusive while together total 12 to 24, $R^2$ and $R^3$ are separately selected from $C_{(1-23)}$ alkyl radicals, which together total $C_{(12-24)}$ carbon atoms and $C_{(6-20)}$ cycloalkyl radicals, $R^4$ is selected from $C_{(6-20)}$ alkyl and cycloalkyl.

2. The composition of claim 1, wherein said coating composition comprises a resin selected from the group consisting of an epoxy resin and an alkyd resin.

3. The composition of claim 2, wherein said coating composition comprises an epoxy resin.

4. The composition of claim 2, wherein said tagging compound is a halogenated imide.

5. The composition of claim 4, wherein said halogenated imide is N-hexyl tetrachlorophthalimide.

6. The composition of claim 4, wherein said halogenated imide is N-octyl tetrachlorophthalimide.

7. The composition of claim 4, wherein said halogenated imide is N-cyclooctyl tetrachlorophthalimide.

8. The composition of claim 4, wherein said halogenated imide is N-dodecyl tetrachlorophthalimide.

9. The composition of claim 4, wherein said halogenated imide is N-adamantyl tetrachlorophthalimide.

10. The composition of claim 4, wherein said halogenated imide is N-heptyl tetrachlorophthalimide.

11. The composition of claim 4, wherein said halogenated imide is N-cycloheptyl tetrachlorophthalimide.

12. The composition of claim 4, wherein said halogenated imide is cyclododecyl tetrachlorophthalimide.

13. The composition of claim 2, wherein said tagging compound is a halogenated amic acid.

14. The composition of claim 13, wherein said halogenated amic acid is N,N-dihexyl tetrachlorophthalamic acid.

15. The composition of claim 2, wherein said tagging compound is a halogenated amide.

16. The composition of claim 2, wherein said coating composition comprises an alkyd resin.

17. A coating composition in accordance with claim 1, wherein the tagging compound has been microencapsulated with a natural or synthetic resin.

18. A coating composition in accordance with claim 1, where the tagging compound is microencapsulated with gelatin protein or gum arabic.

19. A coating composition in accordance with claim 18, where the microencapsulated tagging compound has been further reacted with a resorcinol formaldehyde and a urea formaldehyde prior to the incorporation of the resulting tagging compound into the organic resin.

20. A composition in accordance with claim 17, where the tagging compound is N-dodecyl tetrachlorophthalimide.

21. A composition in accordance with claim 17, where the tagging compound is N-cycloheptyl tetrachlorophthalimide.

22. A composition in accordance with claim 17, where the tagging compound is N-cyclooctyl tetrachlorophthalimide.

23. A composition in accordance with claim 17, where the tagging compound is N-adamantyl tetrachlorophthalimide.

24. A composition in accordance with claim 17, where the tagging compound is N-hexyl tetrachlorophthalimide.

25. A composition in accordance with claim 17, where the tagging compound is N,N -dihexyl tetrachlorophlthalamic acid.

26. A composition in accordance with claim 17, where the tagging compound is N-heptyl tetrachlorophthalimide.

27. A composition in accordance with claim 17, where the tagging compound is N-octyl tetrachlorophthalimide.

28. A composition in accordance with claim 17, where the tagging compound is N-cyclododecyl tetrachlorophthalimide.

* * * * *